United States Patent

Sefidvash et al.

(10) Patent No.: US 7,463,706 B2
(45) Date of Patent: Dec. 9, 2008

(54) SYSTEM AND METHOD FOR PERFORMING ON-CHIP SYNCHRONIZATION OF SYSTEM SIGNALS UTILIZING OFF-CHIP HARMONIC SIGNAL

(75) Inventors: Khorvish Sefidvash, Laguna Nigel, CA (US); Keh-Chee Jen, Las Flores, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/765,850

(22) Filed: Jun. 20, 2007

(65) Prior Publication Data

US 2007/0258551 A1 Nov. 8, 2007

Related U.S. Application Data

(63) Continuation of application No. 10/340,408, filed on Jan. 10, 2003, now Pat. No. 7,286,622.

(60) Provisional application No. 60/402,032, filed on Aug. 7, 2002.

(51) Int. Cl.
*H04L 7/00* (2006.01)
*H04B 1/38* (2006.01)

(52) U.S. Cl. ............... 375/354; 375/371; 375/219

(58) Field of Classification Search ........... 375/219, 375/222, 354, 356, 371, 376
See application file for complete search history.

(56) References Cited

U.S. PATENT DOCUMENTS

| 3,967,181 | A | 6/1976 | Chambers et al. |
| 5,179,331 | A | 1/1993 | Sloot |
| 6,263,192 | B1 | 7/2001 | Alderton |
| 6,265,709 | B1 | 7/2001 | Olson et al. |
| 6,487,262 | B1 * | 11/2002 | Moulton et al. ............ 375/356 |
| 6,611,150 | B1 | 8/2003 | Stevens |
| 2003/0053170 | A1 | 3/2003 | Levinson et al. |
| 2004/0017840 | A1 * | 1/2004 | Siwiak ..................... 375/146 |

FOREIGN PATENT DOCUMENTS

| EP | 1 204 214 A1 | 5/2002 |
| SU | 995366 A | 2/1983 |

* cited by examiner

*Primary Examiner*—Tesfaldet Bocure
(74) *Attorney, Agent, or Firm*—McAndrews, Held & Malloy, Ltd.

(57) ABSTRACT

Aspects of the invention provide a method and system for reducing signal distortion within an on-chip transitive module. In response to receipt of a signal bearing at least one external clock frequency, at least one harmonic signal of the signal bearing the at least one external clock frequency may be generated. At least one synchronization clock frequency signal may be created from the generated at least one harmonic signal. The synchronization clock frequency signal may subsequently be supplied to at least one power source. Accordingly, the at least one power source may serve as an input power source to at least one on-chip system component of the transitive module with. In this regard, an output of the at least one power source may have at least a frequency attribute of the synchronization clock frequency signal. The synchronization clock frequency signal may reduce signal distortion produced by the at least one power source.

30 Claims, 5 Drawing Sheets

SYSTEM AND METHOD FOR PERFORMING ON-CHIP SYNCHRONIZATION OF SYSTEM SIGNALS UTILIZING OFF-CHIP HARMONIC SIGNAL

CROSS-REFERENCE TO RELATED APPLICATIONS/INCORPORATION BY REFERENCE

This application is a continuation of U.S. patent application Ser. No. 10/340,408 filed on Jan. 10, 2003 now U.S. Pat. No. 7,286,622, which makes reference to, claims priority to and claims the benefit of U.S. Provisional Patent Application Ser. No. 60/402,032 filed on Aug. 7, 2002.

This application also makes reference to U.S. Pat. No. 6,424,194, U.S. application Ser. No. 09/540,243 filed on Mar. 31, 2000, U.S. Pat. No. 6,389,092, U.S. Pat. No. 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Using 1.8V Power Supply in 0.13 MM CMOS" filed on Jun. 21, 2002, and U.S. application Ser. No. 60/402,090 entitled "System and Method for implementing a Single-Chip Having a Multiple Sub-Layer PHY" filed on Aug. 7, 2002.

All of the above stated applications are incorporated herein by reference in their entirety.

BACKGROUND OF THE INVENTION

Embodiments of the present application relate generally to optical networking hardware, and more particularly to a system and method for performing on-chip synchronization of system signals.

High-speed digital communication networks over copper and optical fiber are used in many network communication and digital storage applications. Ethernet and Fiber Channel are two widely used communication protocols, which continue to evolve in response to increasing need for higher bandwidth in digital communication systems. The Open Systems Interconnection (OSI) model (ISO standard) was developed to establish standardization for linking heterogeneous computer and communication systems. It describes the flow of information from a software application of a first computer system to a software application of a second computer system through a network medium.

The OSI model has seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Importantly, each OSI layer describes certain tasks which are necessary for facilitating the transfer of information through interfacing layers and ultimately through the network. Notwithstanding, the OSI model does not describe any particular implementation of the various layers.

OSI layers 1 to 4 generally handle network control and data transmission and reception. Layers 5 to 7 handle application issues. Specific functions of each layer may vary depending on factors such as protocol and interface requirements or specifications that are necessary for implementation of a particular layer. For example, the Ethernet protocol may provide collision detection and carrier sensing in the physical layer.

Layer 1, the physical layer, is responsible for handling all electrical, optical, opto-electrical and mechanical requirements for interfacing to the communication media. Notably, the physical layer may facilitate the transfer of electrical signals representing an information bitstream. The physical layer may also provide services such as, encoding, decoding, synchronization, clock data recovery, and transmission and reception of bit streams. In high bandwidth applications having transmission speeds of the order of Gigabits, high-speed electrical, optical and/or electro-optical transceivers may be used to implement this layer.

As the demand for higher data rates and bandwidth continues to increase, equipment capable of handling transmission rates of the order of 10 Gigabits and higher is being developed for high-speed network applications. Accordingly, there is a need to develop a 10 Gigabit physical layer device that may facilitate such high-speed serial data applications. For example, XENPAK multi-source agreement (MSA) defines a fiber optical module that conforms to the well-known IEEE standard for 10 Gigabit Ethernet (GbE) physical media dependent (PMD) types. In this regard, XENPAK compatible transceivers may be used to implement the physical layer. Notwithstanding, there is a need for transceivers, which are necessary for implementing 10 Gigabit physical layer applications. The well-known IEEE P802.3ae draft 5 specifications describes the physical layer requirements for 10 Gigabit Ethernet applications and is incorporated herein by reference in its entirety.

An optical-based transitive, for example, may include various functional components which may implement tasks such as clock data recovery, clock multiplication, serialization/de-serialization, encoding/decoding, electrical/optical conversion, descrambling, media access control (MAC), controlling, and data storage.

Many of the different functional components of a transitive module may employ vastly different and unrelated clock signal frequencies that may not be synchronized. The digital switching caused by the many different clocks may be a potential source of noise that cumulatively, may substantially impair and distort any intermediate or output signals that may be generated by the transitive module or on-chip system components.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a method and system for reducing signal distortion within an on-chip transitive module. After the receipt of a signal bearing at least one external clock frequency, at least one harmonic signal of the signal bearing the at least one external clock frequency may be generated. At least one synchronization clock frequency signal may be created from the generated at least one harmonic signal. The synchronization clock frequency signal may subsequently be supplied to at least one power source. Accordingly, the at least one power source may serve as an input power source to at least one on-chip system component of the transitive module. In this regard, an output of the at least one power source may have at least a frequency attribute of the synchronization clock frequency signal. The synchronization clock frequency signal may reduce signal distortion produced by the at least one power source.

The step of generating at least one harmonic signal may further include the step of generating at least one harmonic signal whose frequency is a rational multiple of the at least one external clock frequency signal. The step of generating the at least one synchronization clock frequency signal may further include the step of synchronizing the signal bearing the at least one external clock frequency and the generated at least one harmonic signal. The supplying step may further include the step of producing at least one noise signal by at least one power source, the at least one noise signal being a harmonic noise signal of the synchronization clock frequency signal. The at least one harmonic noise may include a frequency that is a rational multiple of the at least one external clock frequency signal.

In accordance with the invention, a system for reducing signal distortion within an on-chip transitive module may also be provided. At least one frequency generator may be adapted for generating at least one harmonic signal of the signal bearing the at least one external clock frequency. The frequency generator may be configured to be responsive to receipt of a signal bearing at least one external clock frequency. The at least one generator may be adapted for generating at least one synchronization clock frequency signal from the generated at least one harmonic signal. The at least one generator may also be configured for supplying the synchronization clock frequency signal to at least one power source. Accordingly, the at least one power source may serve as an input to at least one on-chip component of the transitive module with an input power. In this regard, an output of the at least one power source may have at least a frequency attribute of the synchronization clock frequency signal. The synchronization clock frequency signal may reduce signal distortion produced by any power source, which has been coupled to the synchronization clock frequency signal.

The at least one generator may be adapted to generate one or more harmonic signal whose frequencies may be a rational multiple of the at least one external clock frequency signal. The at least one generator may further include a synchronizer for synchronizing the signal bearing the at least one external clock frequency and the generated at least one harmonic signal. The at least one power source may produce at least one noise signal that is a harmonic noise signal of the synchronization clock frequency signal. The at least one harmonic noise signal may include a frequency that is a rational multiple of the at least one external clock frequency signal. Notwithstanding, the at least one generator and the synchronizer may be integrated into a single processor such a digital signal processor (DSP).

These and other advantages, aspects and novel features of the present invention, as well as details of an illustrated embodiment thereof, will be more fully understood from the following description and drawings.

DETAILED DESCRIPTION OF THE INVENTION

Figure 1:
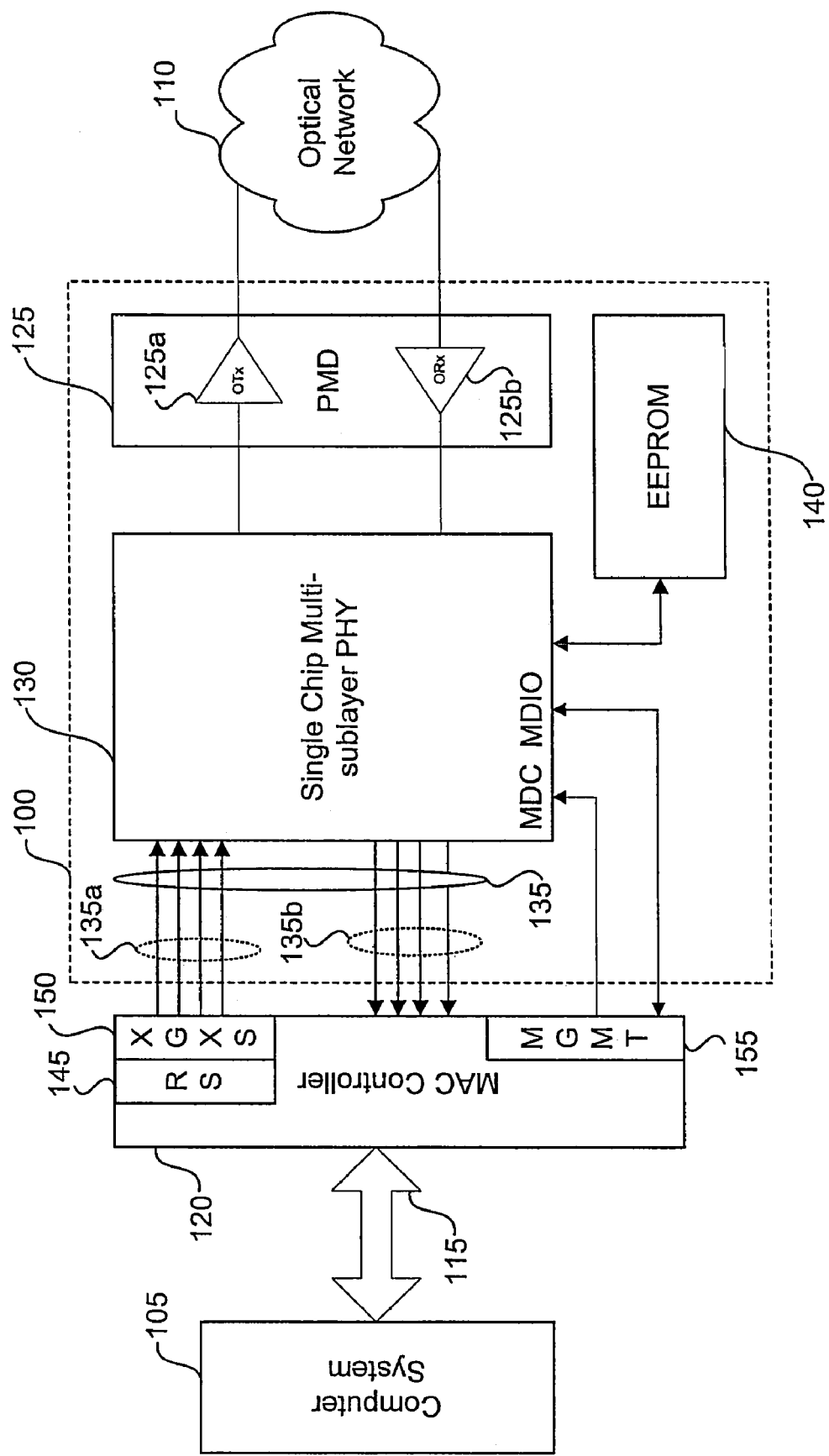
FIG. 1 is a block diagram of an exemplary transitive module in accordance with an embodiment of the invention.

FIG. 1 is a block diagram of an exemplary transitive module 100 in accordance with an embodiment of the invention. Referring to FIG. 1, there is illustrated a computer system 105, a medium access control (MAC) controller 120, a MAC controller interface 115, an optical network 110, a single-chip multimode multi-sublayer PHY device 130, an electrically erasable programmable read only memory (EEPROM) 140, a PMD transmitter 125a and a PMD receiver 125b. PMD transmitter 125a and PMD receiver 125b may be integrated into a single PMD 125 such as a chip or IC, although the invention is not limited in this regard. Transitive module 100 may be an integrated device, which may include the single-chip multimode multi-sublayer PHY device 130, the EEPROM 140, the optical transmitter 125a and the optical receiver 125b. Computer system 105 may interface with MAC controller 120 through MAC controller interface 115 and may communicate with the optical network 110 through the transitive module 100.

Transitive module 100 may be configured to communicate, namely transmit and receive, data between computer system 105 and optical network 110. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1 may provide services to layer 2 and layer 2 may provide services to layer 3. The data link layer, layer 2, may include a MAC layer whose functionality may be handled by a MAC controller 120. In this regard, MAC controller 120 may be configured to implement the well-known IEEE 802.3ae Gigabit Ethernet protocol.

In the arrangements of FIG. 1, the computer system 105 may represent layer 3 and above, the MAC controller 120 may represent layer 2 and above and the transitive module 100 may represent layer 1. The computer system 105 may be configured to build the five highest functional layers for data packets that are to be transmitted over the optical network 110. Since each layer in the OSI model may provide a service to the immediately higher interfacing layer, the MAC controller 120 may provide the necessary services to the computer system 105 to ensure that packets are suitably formatted and communicated to the transitive module 100. During transmission, each layer may add its own header to the data passed on from the interfacing layer above it. However, during reception, a compatible device having a similar OSI stack may strip off the headers as the message passes from the lower layers up to the higher layers.

The transitive module 100 may be configured to handle all the physical layer requirements, which may include, but is not limited to, packetization, serialization/deserialization (SER-DES) and data transfer. Transitive module 100 may operate at a plurality of data rates, which may include 10 Gbps. Data packets received by the transitive module 100 from MAC controller 120 may include data and header information for each of the above six functional layers. The transitive module 100 may be configured to encode data packets that are to be transmitted over the optical medium of the optical network 110. The transitive module 100 may also be configured to decode data packets received from the optical network 110.

The MAC controller 120 may interface with the single-chip multimode multi-sublayer PHY 130 of the transitive module 100 through a 10 Gbps Ethernet attachment unit interface (XAUI) 135. The XAUI 135 may be a low pin count device having a self-clocked bus, which directly evolved from lower data rate protocols. The XAUI may function as an extender interface for a 10 Gigabit media independent interface (XMGII). In this regard, MAC controller 120 may also include an XGMII extender sublayer (XGXS) interface 150 and a reconciliation sublayer (RS) interface 145. MAC controller 120 may include an integrated link management (MGMT) interface 155 that may facilitate communication between MAC controller 120 and a management data input/output (MDIO) interface of the single-chip multi-sublayer PHY 130.

In one aspect of the invention, XAUI 135 may be configured to utilize a plurality of serial data lanes on each of its receive 135a and transmit 135b interfaces to achieve compatible 10 GbE operational speeds. Notably, the XAUI 135 may be configured as two, 4-bit interfaces, each with four serial lines, thereby achieving a throughput of about 10 Gbps. In accordance with the embodiments of FIG. 1, XAUI 135a may be configured to transmit data from the MAC controller 120 to the single-chip multimode multi-sublayer PHY 130. Additionally, XAUI 135b may be configured to transmit data from the single-chip multimode multi-sublayer PHY 130 to the MAC controller 120.

The single-chip multimode multi-sublayer PHY 130 may support multiple modes of operation. In this regard, the single-chip multimode multi-sublayer PHY 130 may be configured to operate in one or more of a plurality of communication modes. Each communication mode may implement a different communication protocol. These communication modes may include, but are not limited to, 10 GbE, fibre channel and other similar protocols. The single-chip multimode multi-sublayer PHY 130 may be configured to operate in a particular mode of operation upon initialization or during operation.

The single-chip multimode multi-sublayer PHY 130 may also include a fully integrated serialization/deserialization device, which may also be configured to operate at speeds of 10 Gbps. During transmission, the single-chip multimode multi-sublayer PHY 130 may serialize the data received over the 4-bit XAUI 135a and transmit the data in a format such as a single 10 Gbps stream via the PMD Tx 125a. During reception, the single-chip multimode multi-sublayer PHY 130 may de-serialize a single 10 Gbps signal received by the PMD Rx 125b and transmit the data in a format such as a 4-bits×3.125 Gbps datastream over XAUI 135b.

The PMD 125 may include at least one PMD transmitter 125a and at least one PMD receiver 125b. In operation, PMD 125 may be configured to receive data from and transmit data to the optical network 110. The PMD transmitter 125a may transmit data originating from the computer system 105 over the optical network 110. The PMD receiver 125b may receive data destined for computer system 105 from the optical network 110 and transmit the data to the computer system 105. The PMD 125 may also be configured to function as an electro-optical interface. In this regard, electrical signals may be received by PMD transmitter 125a and transmitted in a format such as optical signals over the optical network 110. Additionally, optical signals may be received by PMD receiver 125b and transmitted as electrical signals to the computer system 105. In one aspect of the present invention, for Ethernet operation, the 10 Gigabit data rate may actually be 10.3125 Gbps and for Fibre Channel operation, the 10 Giga-bit data rate may actually be 10.516 Gbps, although the invention is not limited in this regard.

The transitive module 100 may also include an EEPROM 140. The single-chip multimode multi-sublayer PHY 130 may be coupled to EEPROM 140 through an interface such as a serial interface or bus. EEPROM 140 may be programmed with information which may include parameters and/or code that may effectuate the operation of the single-chip multimode multi-sublayer PHY 130. The parameters may include configuration data and the code may include operational code such as firmware, although it should be recognized that the information is not limited in this regard.

Figure 2:
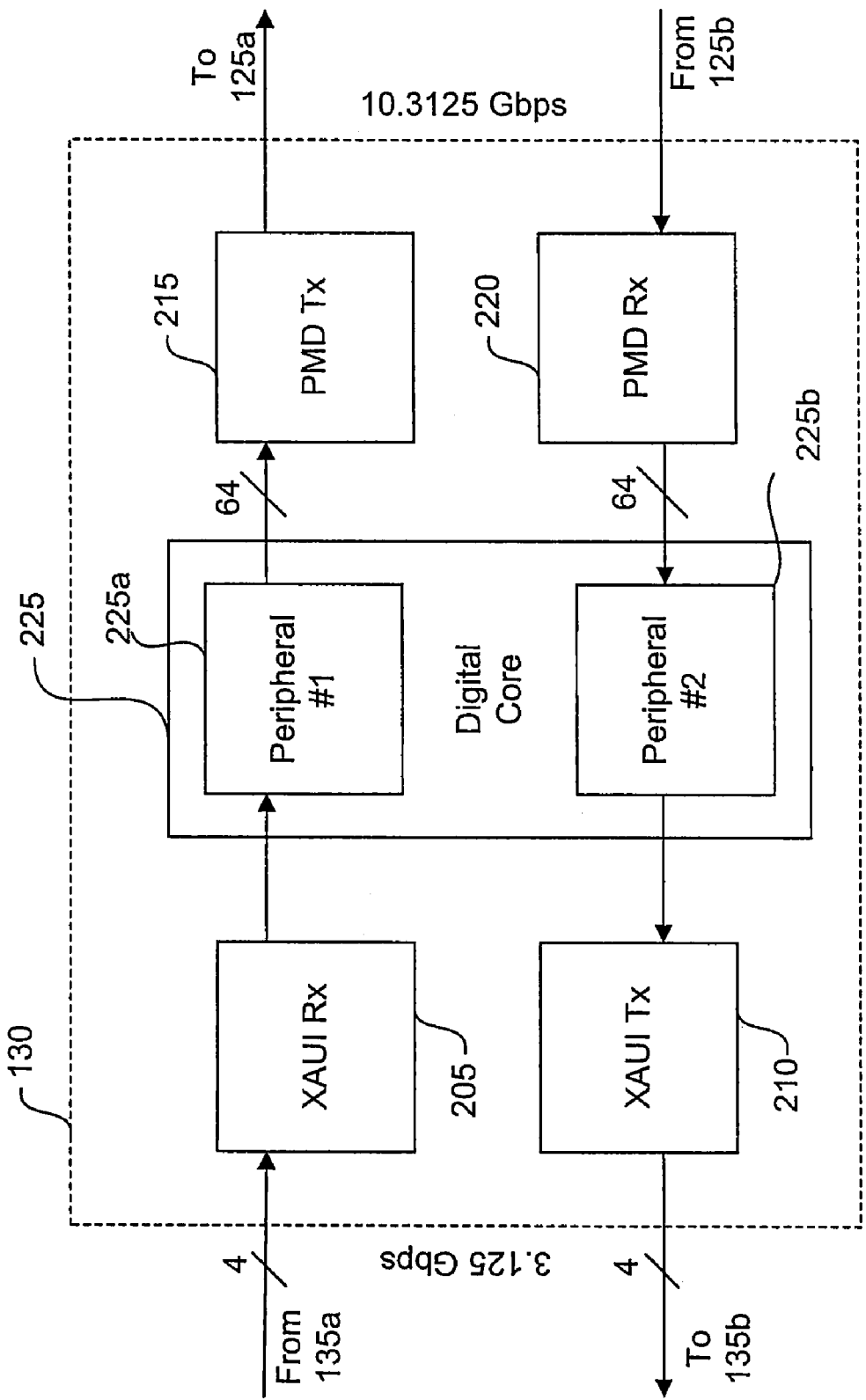
FIG. 2 is a block diagram of an exemplary single-chip multimode multi-sublayer PHY used in the transitive module of FIG. 1 in accordance with an embodiment of the invention.

FIG. 2 is a block diagram of an exemplary single-chip multimode multi-sublayer PHY 130 used in the transitive module of FIG. 1 in accordance with an embodiment of the invention. Referring now to FIG. 2, the single-chip multimode multi-sublayer PHY 130 may include a XAUI receiver 205, a XAUI transmitter 210, a PMD transmitter 215, and a PMD receiver 220. The single-chip multimode multi-sublayer PHY 130 may further include a digital core 225 which may have one or more peripherals, for example, peripheral #1 225a and peripheral #2 225b. The digital core 225 may include an XGXS PCS sublayer and a PMD PCS sublayer. A XAUI TX/RX sublayer may include the XAUI transmitter 210 and XAUI receiver 205 sections. A PMD TX/RX sublayer may include the PMD transmitter 215 and PMD receiver 220 sections. Various sublayers of the single-chip multimode multi-sublayer PHY 130 may be fabricated in 0.13 micron CMOS technology.

In operation, digital core 225 may be configured to serialize and deserialize (SERDES) received data. Data from the XAUI 135a may be received at XAUI receiver 205, serialized by the digital core 225, and transmitted as a single 10 Gbps datastream by the PMD transmitter 215. This may be considered the transmit path. Data from the optical PMD receiver 125b may be received at PMD receiver 220, deserialized by the digital core 225, and transmitted as, for example, 4-bit× 3.125 Gbps streams by the XAUI receiver 210. This may be considered the receive path.

Figure 3:
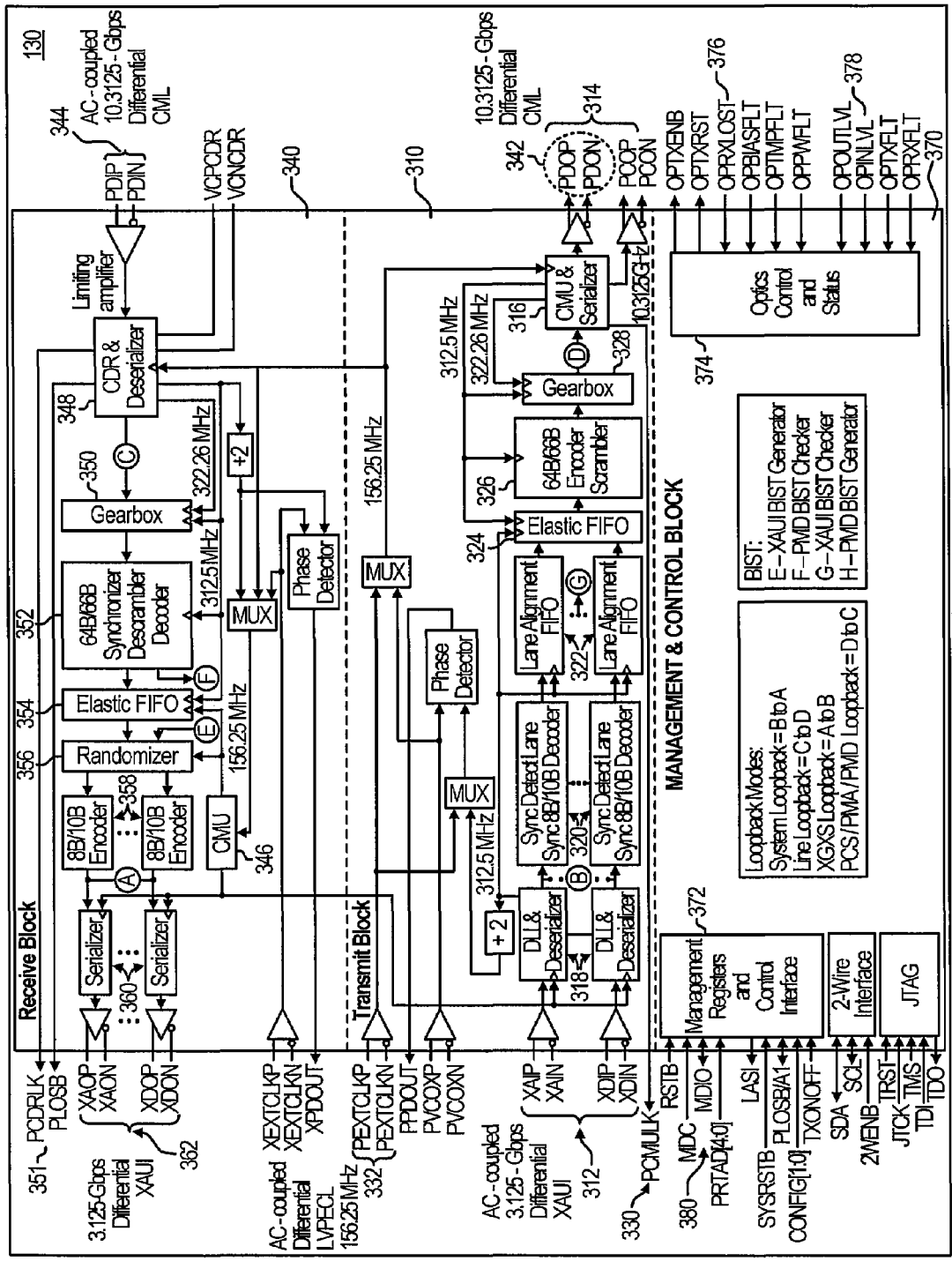
FIG. 3 is a schematic block diagram illustrating an embodiment of the single-chip multimode multi-sublayer PHY of FIG. 2 in accordance with an embodiment of the invention.

FIG. 3 is a schematic block diagram illustrating an embodiment of the single-chip multimode multi-sublayer PHY 130 of FIG. 2 in accordance with an embodiment of the invention. FIG. 3 may provide a more detailed schematic block diagram of the single-chip multimode multi-sublayer PHY 130 of FIG. 2, which may be used in the transitive module 100 of FIG. 1. Referring to FIG. 3, the single-chip multimode multi-sublayer PHY 130 may include three main functional blocks. Namely, a transmit block 310, a receive block 340, and a management and control block 370. Clock interfaces may be provided for configuring the XAUI and PMD interfaces for operating in a synchronous mode or an asynchronous mode.

The transmit block 310 may include a clock multiplier unit (CMU) and serializer block 316, a gearbox 328, an encoder scrambler block 326, at least one elastic FIFO 324, one or more lane alignment FIFOs 322, one or more lane detect lane sync decoders 320, and one or more DLL and deserializer 318. The receive block 340 may include a CDR deserializer 348, a gearbox 350, a synchronizer descrambler decoder block 352, at least one elastic FIFO 354, a randomizer 356, one or more encoders 358, one or more serializers 360 and a CMU 346. The management and control block 370 may include a management registers and control interface block 372 and an optics and control status block 374.

In operation, the transmit block 310 may be configured to receive data formatted in a format such as a 4-lane 3 Gigabit data at the XAUI receivers 312 and reformat the received data in a format suitable for 10 Gigabit serial transmission at the PMD differential CML drivers 314. The PMD CMU and serializer 316 in the PMD TX/RX sublayer may be configured to be phase-locked (PL) to a reference clock such as an external reference clock. In one aspect of the invention, each of the XAUI receivers 312 may be configured to handle one lane of received data. In this regard, each of the XAUI receivers 312 in the XAUI TX/RX sublayer may include an internal delayed-lock loop (DLL), which may be adapted to synchronize the sampling clock signal to any incoming data signal.

A PLL is an electronic circuit that may be configured to control and frequency source such as an oscillator, so that it maintains a constant phase angle relative to a reference signal. The reference signal may be extracted from a received signal. PLLs may be used in applications such as, bit synchronization, symbol synchronization, and coherent carrier tracking. An exemplary digital PLL (DPLL) circuit may include a serial shift register, a phase corrector circuit and a local clock signal. The serial shift register may be configured to receive digital input samples. The digital input samples may be extracted from the received signal. Preferably, the local clock signal may be stable enough to supply clock pulses that may drive the serial shift register. The phase corrector circuit may be adapted to take the local clock signal and regenerate a stable clock signal that may be in phase with the received signal. In this regard, the phase corrector circuit may be configured to slowly adjust the phase of the regenerated clock signal to match the received signal. The regenerated clock signal may be utilized to sample the received data and determine the value of each received bit.

In operation, the received signal may be sampled at the local clock rate. This may generally be a multiple of the nominal regenerated clock frequency such as 32 times. Each sample, whether logic zero (0) or logic one (1), may be shifted into the shift register. The need to adjust the phase may be determined by viewing a set of samples of the received signal. At each regenerated bit period, the shift register may be consulted. If the center of the received bit lies at the center of the shift register, the two clocks may be deemed to be in phase and no compensation or adjustment may be necessary. If the regenerated clock signal lags the reference signal, then the phase adjuster may provide compensation by advancing the regenerated clock. If the regenerated clock signal leads the reference signal, then the phase adjuster may provide compensation by retarding the regenerated clock.

Accordingly, after synchronization, a 3 Gigabit sampling clock signal, for example, may be configured to sample the data signal in the center of a data eye pattern. In this arrangement, a phase relationship between the edge transitions of the data signal and those of the sampling clock signal may be determined and compared by a phase/frequency discriminator. Output pulses from the discriminator may indicate the direction that may be required for adequately correcting a phase of the signal. Additionally, a loop filter may be configured to smooth any pulses that may occur in the signal. An output signal generated by the loop filter may be adapted to control one or more internal phase interpolators, which may be used to generate the sampling clock. The XAUI CMU 316 may be adapted to function as a phase locked loop (PLL) within the XAUI TX/RX sublayer and may be configured to generate clocks for internal DLL phase interpolations.

The single-chip multimode multi-sublayer PHY 130 may include one or more loss-of-signal (LOS) detect circuits. In one embodiment of the invention, the single-chip multimode multi-sublayer PHY 130 may be configured to include a loss-of-signal (LOS) detect circuit for each XAUI DLL within the XAUI TX/RX sublayer. In this regard, the LOS detect circuits may be configured to monitor and detect data presence at the XAUI receiver inputs 312. A minimum single-ended input signal swing may be used for a valid phase lock condition although the invention is not so limited. The status of each individual LOS detector may be determined from one or more bits and/or internal register of the single-chip multimode multi-sublayer PHY 130.

In one aspect of the present invention, the XAUI serial inputs 312 for the transmit block 310 of the XAUI TX/RX sublayer may be AC-coupled. In this regard, AC coupling may prevent voltage drops across input devices of the single-chip multimode multi-sublayer PHY 130 whenever the input signals may be sourced from a higher operating voltage device. In a case where DC coupling may be used, it may be necessary to ensure that the input signals do not exceed certain $V_{DD}$ levels. Additionally, noise due to overshooting and undershooting of transient currents may also be appropriately handled.

Each XAUI serial data stream for the XAUI serial inputs 312 may be deserialized by one of the DLL and de-serializers 318 integrated within the XAUI TX/RX sublayer. DLL and de-serializers 318 may include one or more serial-to-parallel converters that may be adapted to create, for example, a 10-bit word from the receive serial input data stream. DLL output clocks may be provided and configured to drive the serial-to-parallel converters and/or DLL and de-serializer 318. In normal operation, the DLL may recover the clock from the input data signal. In a case where no data is present, the clock may be recovered from an internal reference clock. In this regard, the output may be sent to the XGXS PCS sublayer in the digital core 225 (FIG. 1).

The XGXS PCS sublayer may include a synchronization (SYNC) sub-block. The sync acquisition sub-block in the XGXS. PCS sublayer may be configured to perform code group synchronization, for example, on the incoming 10-bit bytes resulting from the DLL & deserializer 318. A two-stage 10-bit shift register may be configured to recognize a valid boundary of the input data stream. For example, the two-stage 10-bit shift register may be configured to recognize a /COMMA/ (K28.5) code group, which may be used to indicate a valid data boundary. In this case, upon detection of a single /COMMA/, or other suitable boundary, at least one of the 8B/10B decoders 320 may be enabled. Upon detection of four /COMMA/ code groups without any intervening invalid code group errors, a sync acquisition may be declared.

The 8B/10B decoders 320 may be configured to perform error checks, which may include, but are not limited to, illegal code checks, disparity checks and invalid code checks. In one aspect of the invention, both an illegal code and a running disparity error may cause an invalid code. In this case, an invalid code counter, which may be maintained for performance monitoring, may be incremented. The invalid code counter may be cleared upon a read access or other suitable method. The 8B/10B decoders 320 may also be configured to handle certain decoding tasks within the XGXS PCS sublayer.

A difference between the number of 1's and 0's in a block of data may be characterized as a running disparity (RD). A RD may be regarded as being positive when there are more ones (1s) than zeros (0s) and negative when there are more zeros (0s) than ones (1s). In an exemplary encoding scheme, each encoded 10-bit word may be assigned a RD of 0, +2, or −2, in order to ensure a high bit transition density for reliable clock recovery. Additionally, the RD encoding may be alternated for DC balancing. The balancing may be achieved by maintaining an equal number of ones (1s) and zeros (0s). Upon receipt of an invalid code, a decoder may replace the invalid code with an error code (/E/) K30.7, and may increment the invalid code counter. Upon receipt of a legitimate error code, /E/, one or more of the 8B/10B decoders 320 may pass the error to the XGXS PCS sublayer without incrementing the invalid counter.

Each of the outputs of the 8B/10 decoders 320 may be coupled to a corresponding one of a plurality of lane alignment FIFOs 322. Each lane assignment FIFO 322 may have a corresponding read and write pointer. In operation, at the start of lane alignment by each of, for example, four lane alignment FIFOs 332, the four Lane Alignment FIFO write-pointers within the XGXS PCS sublayer may be enabled upon detection of a boundary, such as an /A/. The FIFOs common read-pointer may be enabled when all four XAUI lanes have detected /A/. Upon detection of an /A/ in one lane without /A/ detections in the other three lanes within a programmable window or skew budget, all FIFOs may be reset, thereby forcing the lane alignment process to start over again. The lane Alignment FIFOs. 322 may be adapted to support lane skew compensation of, for example, 5 byte-clocks. Notwithstanding, in accordance with the invention, the single-chip multimode multi-sublayer PHY 130 may permit about 21 external UIs in compliance with the IEEE 802.3ae standard.

The PMD PCS sublayer may utilize a transmission code to improve the transmission characteristics of information, which may be transferred across a communication link. The transmission code may also support transmission of control and data characters. In this regard, the single-chip multimode multi-sublayer PHY 130 may be configured to support 64B/66B encoding as defined by IEEE 802.2ae clause 49 for transmission code. Advantageously, this may ensure the existence of sufficient synchronization information in bit stream to make clock recovery more robust at the receiver.

The output of the lane alignment FIFOs 322 may be coupled to at least one elastic FIFO 324. The output of the at least one elastic FIFO 324 may be coupled to an encoder scrambler block 326. The output of the encoder scrambler block 326 may be coupled to a TX gearbox 328 embedded in the PMD PCS sublayer. The frame synchronizer function of the encoder scrambler block 326 may be configured to encode, for example, a 66-bit frame boundary within the received data. This may permit the frame synchronizer function of the frame synchronizer descrambler decoder block 352 to lock to a 66-bit block using a sync header of the 66-bit frame boundary. In one aspect of the invention, the encoder scrambler block may be configured to encode the blocks of data in accordance with the IEEE 802.3ae specification.

The TX gearbox 328 in the PMD PCS sublayer may be adapted to function as a buffer that may convert, for example, 64-bit data to 66-bit data for more efficient serialization. In one aspect of the invention, the TX gearbox 328 may be configured to receive 64-bit data from the scrambler 344 and a 2-bit sync from a type generator at a frequency such as 156.25 MHz. The TX gearbox 328 may produce a 66-bit data output at a frequency such as 322.265 MHz to the PMD CMU and serializer 316 within the PMD TX/RX sublayer. A register bank may be employed which may be accessed in a circular manner. In this regard, data may be read out of the TX gearbox 328 using an internally generated clock signal such as a 322.265 MHz clock. The data may be converted to a 10 Gigabit serial stream within PMD TX/RX sublayer and driven off-chip by the differential CML outputs 314. In one embodiment of the invention, bit zero (0) of frame zero (0) or the least significant bit (LSB), may be shifted out first. The PMD CMU and serializer 316 within the PMD TX/RX sublayer may have a PLL that may be configured to generate a 10 Gigabit clock by multiplying for example, the internal 156.25 MHz reference clock.

The single chip multimode multi-sublayer PHY 130 may also include a lock detect circuit. The lock detect circuit may be configured to monitor the frequency of any internal VCO. The status of the lock detect circuit may be indicated by one or more bits and/or registers, for example bit zero (0) of an analog transitive status register (ATSR). A register bit such as a P_LKDTCMU bit may also be configured to transition to a high state whenever the PMD CMU PLL is phase locked. The CMU lock detect signal may also be provided as an output status at the PCMULK pin 348.

The CML serial outputs 314, namely PCOP, PCON, PDOP and PDON may be AC-coupled or DC-coupled. A source voltage of about +1.8V may power the CML outputs 314. Various pins on single-chip multimode multi-sublayer PHY 130 may be configured to provide power to the PCOP, PCON, PDOP and PDON CML serial outputs 314. The PCOP, PCON, PDOP and PDON CML serial outputs 314 may be adapted as high-speed CML outputs that may include a differential pair designed to drive, for example, a 50Ω transmission line. An output driver may be back terminated to, for example, a 50Ω on-chip resistor, in order to provide snubbing of any signal reflections.

Management and control block 370 may include suitable control logic and circuitry for controlling management functions of the single-chip multimode multi-sublayer PHY 130. For example, management registers and control interface block 372 may include one or more registers that may be configured to deactivate the optical transmitter in the optical PMD 125a. Deactivation may be achieved, for example, by transmitting a constant logical low level (0) at the output of PMD 125. A polarity of PDIP, PDIN 344 and PDOP, PDON 342 may be reversed in order to accommodate difficult printed circuit board (PCB) layouts. In this regard, each differential signal pair may have its own polarity control bit in the PMD/Optics Digital Control Register 374.

In accordance with the invention, the single-chip multimode multi-sublayer PHY 130 may comply with the jitter specifications proposed for 10 Gbps Ethernet equipment as defined by IEEE 802.3ae standards. Furthermore, the reference clock characteristics may also be adapted to adhere to this standard although the invention is not so limited.

In operation, receiver block 340 may be configured to receive 10 Gigabit serially formatted PMD data. Upon receipt of the serially formatted data, receiver block 340 may reformat the data for transmission in a suitable format such as a 4-lane 3 Gigabit format by XAUI transmitter 210 (FIG. 2). One of the 3 Gigabit CMU clocks, for example, CMU 346 in the XAUI TX/RX sublayer may be adapted to retune some or all of the XAUI transmitters. The XAUI CMU 346 in the XAUI TX/RX sublayer may be phase-locked to, for example, an external reference clock.

The PMD clock and data recovery (CDR) and serializer 348 within the PMD TX/RX sublayer may be configured to generate a clock signal having, for example, the same frequency as the incoming data bit rate (10 Gigabit rate) at the CML serial data inputs, PDIP and PDIN 344. In this regard, the clock may be phase-aligned by a PLL so that it samples the data in the center of the data eye pattern.

The phase relationship between the edge transitions of the data and those of the generated clock may be compared by a phase/frequency discriminator. In this arrangement, a phase relationship between the edge transitions of the data signal and those of the sampling clock signal may be determined and compared by a phase/frequency discriminator. Output pulses from the discriminator may indicate the direction that may be required for adequately correcting a phase of the signal. Additionally, a loop filter may be configured to smooth any pulses that may occur in the signal. An output signal generated by the loop filter may be adapted to control one or more internal phase interpolators, which may be used to generate the sampling clock. The output of the loop filter may control the frequency of the VCO, which may generate the recovered clock. Frequency stability without incoming data may be guaranteed, for example, by an internal reference clock. In this case, the internal reference clock may provide an appropriate clock to which the PLL may lock whenever there is a loss of data signal.

The single-chip multimode multi-sublayer PHY 130 may also include a lock detect circuit that may be adapted to monitor the 10 Gigabit frequency of any internal VCO within the PMD TX/RX sublayer. In one embodiment of the invention, the frequency of the incoming data stream may be configured to be within, for example, ±100 ppm of the 10 Gigabit data stream for the lock detector to declare a signal lock. The lock detect status may be indicated by one or more bits and/or registers, for example, bit zero (0) of the ATSR. In this case, the P_LKDTCDR bit may be configured to transition to a high state whenever the PMD CDR is locked to the incoming data. The CDR lock detect signal may also be provided as an output status at the PCDRLK pin 364.

The single-chip multimode multi-sublayer PHY 130 may also include a LOS detect circuit that may be configured to monitor the integrity of the serial receiver data path in the PMD TX/RX sublayer. A peak detector may be configured to look for a minimum amplitude swing in the signal. In a case where there is no serial data input present, a bit such as a LOS_P bit in the ATSR may be set to zero (0). In one aspect of the invention, during operation, the CDR and deserializer block 348 may attempt to lock to the reference clock whenever the signal level falls below a minimum amplitude swing and a bit such as a LOS_B bit may be set accordingly. The LOS from a peak detector condition may also be reflected at the PLOSB output signal pin 350.

The optics control and status block 374 may be adapted to include at least one OPRXLOS pin 376. The OPRXLOS input pin 376 in the optics control and status block 374 may be utilized by an external optical receiver's LOS monitor to indicate when there is loss-of-light condition. The OPRXLOS pin 376, whether directly or in combination with the peak detector logic, may be configured to force the CDR to lock to the reference clock. A polarity of the OPRXLOS pin 376 may be programmable through one or more bits and/or registers. For example, an OPINLVL pin 378 may be adapted to control a OPINLVL bit in a PHY identifier register. In accordance with an embodiment of the invention, the OPINLVL bit may be configured to change the polarity of OPRXLOS pin 376.

The PMD CML serial inputs PDIP, PDIN 344 on the single-chip multimode multi-sublayer PHY 130 may be AC-coupled. Advantageously, AC coupling may prevent voltage drops across input devices of the single-chip multimode sublayer PHY 130 when the input signals are sourced from a higher operating voltage device. In a case where DC coupling is used, it may be pertinent to ensure that input signals do not exceed certain $V_{DD}$ levels. Additionally, it may be necessary to compensate for noise due to overshoot and undershoot transients.

The PMD serial data stream may be deserialized to, for example, a 66-bit word format by, for example, a serial-to-parallel converter in the PMD TX/RX sublayer such as CDR and deserializer block 348. An output CDR and deserializer block 348 may provide a clock signal necessary for operation of the serial-to-parallel converter. Under normal operation, the CDR and deserializer block 348 may be configured to recover the clock from the data signal. If there is no data present, the clock may be recovered from a reference clock such as an internal reference clock. The output of the CDR and deserializer block 348 may be sent to the RX Gearbox 350 within PMD PCS sublayer. The RX Gearbox 350 may be configured to perform an equivalent function, albeit in reverse, as the TX Gearbox 328.

The output of the RX gearbox 350 may be coupled to a frame synchronizer descrambler decoder block 352 embedded in the PMD PCS sublayer. The frame synchronizer function of the frame synchronizer descrambler decoder block 352 may be configured to monitor and detect frame boundaries, for example, a 66-bit frame boundary within the received data. The frame synchronizer function of the frame synchronizer descrambler decoder block 352 may lock to 66-bit blocks using a sync header within the 66-bit frame boundary. Once locked, the outputs of 66-bit data blocks may be determined. The descrambler function of the frame synchronizer descrambler decoder block 352 may be configured to process a payload for the received data. In this regard, the descrambler function of the frame synchronizer descrambler decoder block 352, may utilize the same polynomial employed by the scrambler function of the encoder scrambler block 326, to reverse any effects of scrambling. Subsequently, the decoder function of the frame synchronizer descrambler decoder block 352 may decode the blocks of received data. In one aspect of the invention, the decoder may be configured to decode the blocks of received data in accordance with the IEEE 802.3ae specification.

The output of the frame synchronizer descrambler decoder block 352 may be coupled to an elastic FIFO 354 located within the XGXS sublayer. The output of the elastic FIFO 354 may be coupled to a randomizer 356 located within the XGXS PCS sublayer. Randomizer 356 may be configured to reduce EMI during an inter-packet gap (IPG). At least some of the resultant idle patterns at the XAUI transmitters may be repetitive high-frequency signals, which may be due, for example, to at least some of the 8B/10B encoders. The randomizer 356 may output random a random pattern, such as an /A/K/R/ pattern, in one or more of the data lanes during the IPG. The randomizer 356 may be configured to start its randomization processing on a column of the data containing, for example, an end-of-packet (EOP) byte (T), and end on a SOP. In one aspect of the invention, randomizer 356 may be adapted to utilize the polynomial, $1+x^3+x^7$ in compliance with the IEEE 802.3ae Draft 5.0 standard.

The output of the randomizer 356 may be coupled to one or more encoders, for example, 8B/10B encoders 358, located within the XGXS PCS sublayer. The 8B/10B encoders 358 may be adapted so that each of 8B/10B encoders may process a lane of data. In this case, the 8B/10B encoders 358 may be configured to convert a byte-wide data stream of random ones (1s) and zeros (0s) into, for example, a 10-bit DC-balanced serial stream of ones (1s) and zeros (0s). In one aspect of the invention, the DC-balanced serial stream of ones (1s) and zeros (0s) may have a maximum run length of about 6. Sufficient bit transitions may be provided, for example by software, to ensure reliable clock recovery.

Each of the outputs of the 8B/10B encoders may be coupled to an input of one or more serializers 360. In operation, data may be read out of the 8B/10B encoder 358 using for example, an internally generated clock. In one aspect of the invention, the internally generated clock may be configured to have a frequency of about 312.0-MHz clock. The data may then be converted to, for example, a 3 Gigabit serial stream within XAUI TX/RX sublayer and driven off-chip. Output pins XAOP, XAON, XDOP and XDON 362 may be configured to drive the output of serializers 360 off-chip. In one aspect of the invention, bit zero (0) of frame zero (0) or the LSB may be shifted out first and may be mapped to "A" of the 8B/10B encoder 358.

A XAUI CMU 346, which may be located within the XAUI TX/RX sublayer, may include a PLL that may have the capability to generate a clock signal such as the 3 Gigabit clock. For example, XAUI CMU 346 may have the capability of multiplying an internal 156.25 MHz reference clock to generate the 3 Gigabit clock. The single-chip multimode multi-sublayer PHY 130 may also include a lock detect circuit. The lock detect circuit may be configured to monitor a frequency of any internal VCO. In this regard, a CMU lock detect bit may be configured to transition to a high state whenever the XAUI CMU 346 PLL gets locked. The lock detect status may be indicated by one or more bits and/or registers, for example, bit 7 of the ATSR.

The XAUI serial outputs, XAOP, XAON, XDOP, XDON 362 may be AC-coupled CML outputs. In this regard, the XAUI serial outputs, XAOP, XAON, XDOP, XDON 362 CML outputs may be powered by for example, by a +1.2V voltage source. The XAUI serial outputs, XAOP, XAON, XDOP, XDON 362 may be adapted to be high-speed outputs and may include a differential pair designated to drive a 50Ω transmission line. The output driver may be back terminated to 50Ω on-chip resistor, which may provide snubbing of any signal reflections. The output driver may also be configured to possess pre-emphasis capability that may enable it to compensate for frequency selective attenuation of FR-4 traces. Advantageously, this may effectively compensate for any inter symbol interference (ISI) that may occur. The pre-emphasis capability may be controlled by one or more bits and/or registers such as a XAUI pre-emphasis controller register.

In one embodiment of the invention, various interfaces of the single-chip XAUI transmit block 310 and receive block 340 may have the capability to reverse the lane order and/or the lane polarity. Advantageously, XAUI I/O interface lane assignment package pins may be reversed to accommodate difficult PCB layouts. This capability may be controlled via one or more bits or registers such as a XAUI digital control register. In one aspect of the invention, a lane flipper may be configured to perform a byte-wise flip of any internal lane data. This may include, but is not limited to, 32-bit data. By default, lane "A" may be configured to carry byte zero (0), lane "B" may be configured to carry byte one (1), lane "C" may be configured to carry byte two (2), and lane "D" nay be configured to carry byte three (3).

In another embodiment of the invention, whenever the lane flipper is enabled, lane "A" may be configured to carry byte three (3), lane "B" may be configured to carry byte two (2), lane "C" may configured to carry byte one (1), and lane "D" may be configured to carry byte zero (0). In this regard, reversal of the lanes may be achieved by setting one or more bits and/or registers. For example, a bit such as a XAUI_TX_FLIP_B and a XAUI_RX_FLIP_B which may be located in a XAUI digital control register in the management registers and control interface block 372, may be set or cleared in order to reverse the XAUI lane order.

In yet a further embodiment of the invention, one or more XAUI I/O interface bit assignment (P to N) to package pins may be reversed in order to accommodate difficult PCB layouts. Assert bits such as a XAUI_TZ_INV and a XAUI_RX_INV bit, which may be located in a XAUI digital control register in the management registers and control interface block 372, may be set or cleared in order to reverse the XAUI lane polarity.

In accordance with the invention, the single-chip multimode multi-sublayer PHY 130 may be configured to support asynchronous clocking mode operation of the XAUI and PMD interfaces. The local reference clock or external transmit VCXO may be adapted to function in accordance with the IEEE specifications. In this regard, one or more elastic FIFO buffers may be configured to be an integral part of the asynchronous operation mode. For example, receive block 340 may include one or more elastic FIFOs 354 and the transmit block 310 may include one or more elastic FIFOs 324. The elastic FIFOs 354, 324 may be configured to accommodate a frequency difference of up to 200 ppm between a recovered clock and a local reference clock. The elastic FIFOs 354, 324 may have read and write pointers, which may be used for data access and manipulation. The Idle columns of data may be inserted or deleted during the IPG once the distance between the elastic FIFO's read and write pointers exceed a given threshold. In accordance with one aspect of the invention, idle columns of four bytes of data may be inserted or deleted during the IPG. In addition, a column of sequence orders may be deleted during the IPG once the distance between the elastic FIFO's read and write pointer exceed a threshold. In accordance with another aspect of the invention, the delete adjustments may occur on IPG streams that contain at least two columns of idles or sequence order sets.

Figure 4:
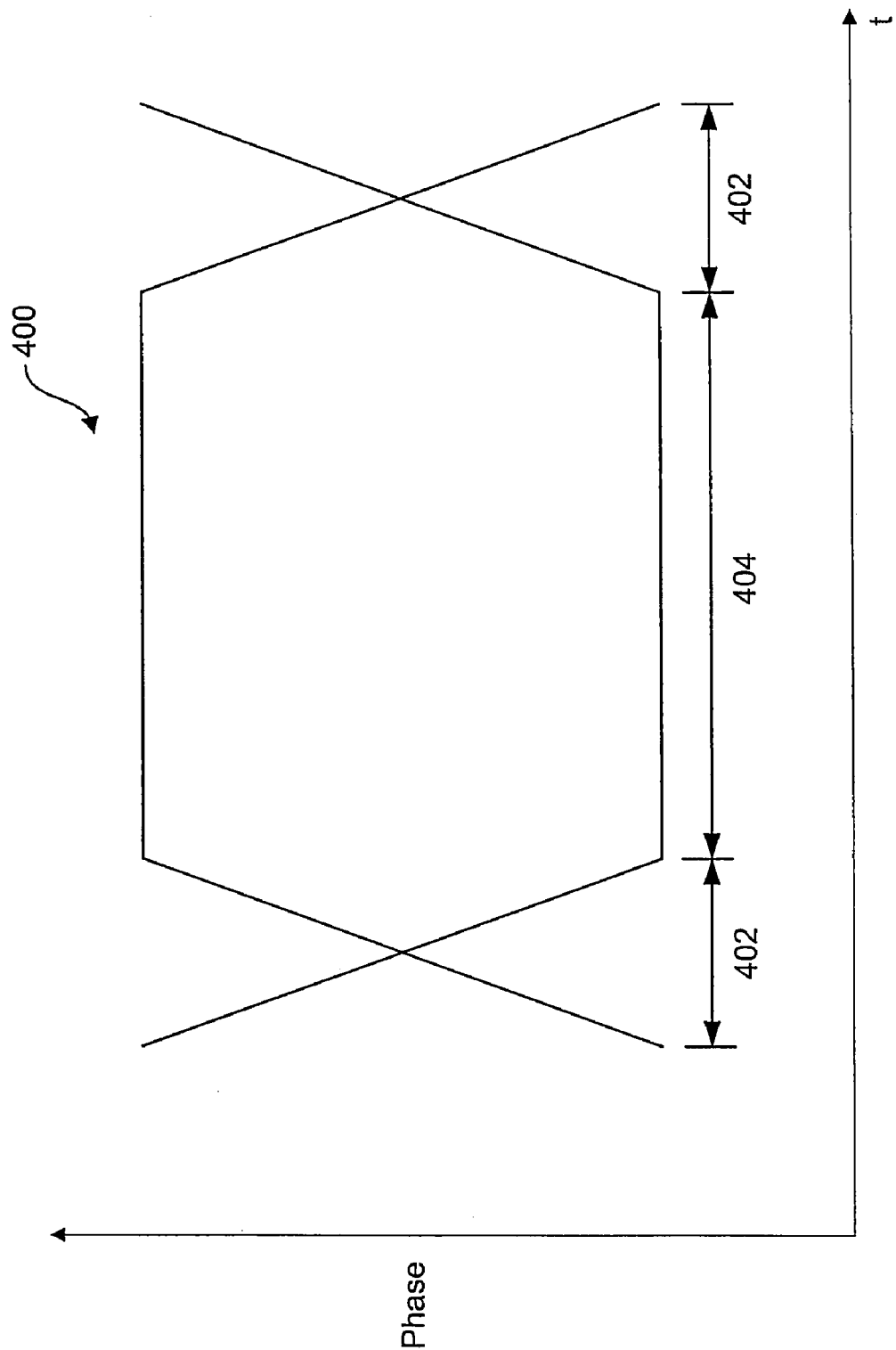
FIG. 4 is an embodiment of an exemplary idealized eye pattern in accordance with an embodiment of the invention.

FIG. 4 is an embodiment of an exemplary idealized eye pattern 400 in accordance with an embodiment of the invention. Referring to FIG. 4, the eye pattern 400 may be analyzed in an effort to provide system information such as system performance. Eye pattern 400 may be derived by superimposing two or more sampled signals. In this regard, a plurality of high-speed transitive module output signals may be superimposed to produce eye pattern 400. For example, outputs from the transitive module 100 or modules such as the single-chip multimode multi-sublayer PHY 130, included therein, may be superimposed to produce eye pattern 400. The eye pattern 400 may be generated using optical signals or electrical signals and may accordingly be identified as an optical or an electrical eye pattern respectively. Eye pattern 400 may be a created by superimposition of ones (1s) and zeroes (0s) and their transitional states. The eye pattern 400 illustrated in FIG. 4 may be idealized since the superposition of many signals may typically cause a distortion in the eye pattern. For example, an open eye pattern may correspond to a small signal distortion, while a closed eye pattern may indicate a large signal distortion.

In general, noise may be a source of signal distortion and may propagate and show up in system signals such as those utilized to generate eye pattern 400. For example, noise in one part of a circuit or a system may propagate to other parts of the circuit or the system. One type of noise that may occur is noise due to the switching of digital circuitry within the system whenever there is a transition from a high level to a low level. For example, a clock, inverter or combinational logic may generate noise whenever there is a transition from logic zero (0) to logic one (1) or from a logic one (1) to logic zero (0). The noise resulting from some or all of the digital circuitry in, for example, the transitive module 100 or the single-chip multimode multi-sublayer PHY 130, due to switching may distort the signal waveform of the eye pattern 400. Furthermore, because switching in the digital circuitry may occur at unrelated and unsynchronized frequencies, the noise may further distort the signal waveform in the transition time regions 402, 404, thereby causing jitter, in the eye pattern 400.

In one embodiment of the invention, an external clock signal such as PEXTCLK 374 may be coupled to the single-chip multimode multi-sublayer PHY 130. The external clock signal PEXTCLK 332 may be a 156.25 MHz clock. The single-chip multimode multi-sublayer PHY 130 may be adapted such that at least some of the clocks signals used in the single-chip multi-sublayer PHY 130 may be a function of the external clock PEXTCLK 332. Some of the clock signals used by the single-chip multimode multi-sublayer PHY 130 may be clocked at the harmonic frequencies of the external clock PEXTCLK 332. A harmonic frequency of the external clock frequency may be a rational number multiple of the external clock frequency. In this regard, the harmonic frequency may be a p/q multiple where p and q are integers. Additionally, the external clock frequency may itself be considered a harmonic frequency of its harmonic frequencies. In addition, the single-chip multimode multi-sublayer PHY 130 may also be adapted such that at least the generated harmonic clock signals and the external clock signal are synchronized.

Advantageously, when particular clock signals used by the single-chip multimode multi-sublayer PHY 130 are synchronized and the particular clock signals are clocked at a harmonic frequency of the external clock frequency (or vice versa), then noise generated during switching of the digital circuitry by the particular clock signals may at most, substantially affect only a part of the transition time regions 402 of the eye pattern 400 and other synchronous signals. In this regard, the noise from the digital circuitry may not substantially affect any significant time region 402, 404 of the eye pattern 400 or other synchronized signals.

In one embodiment of the present invention, harmonic synchronization of various signals may be accomplished within the single-chip multimode multi-sublayer PHY 130 using at least a combination of digital counters and phase-locked loops. The eye pattern 400 may be a superposition of 66 156.25 MHz signals or a single 10.3125 GHz output signal from the single-chip multimode multi-sublayer PHY 130. The external clock frequency may be for example, a 156.25 MHz signal or a harmonic clock frequency of twice 156.25 MHz or 312.50 MHz. In this case, any resulting digital switching noise due to the external clock frequency may only substantially affect, if at all, a part of the transition time regions 402 of the eye pattern 400 of the 10.3125 GHz output signal. Thus, for example, the ones (1s) or zeros (0s) may not be substantially distorted in the signal time region 404 from digital switching noise from circuitry clocked, for example, by the external clock frequency of 156.25 MHz or by the harmonic clock frequency of 312.50 MHz. Advantageously, any jitter that may occur may be substantially controlled. Additionally, digital switching noise that may result from circuitry clocked by other harmonic clock frequencies may have the same effect.

In a further aspect of the invention, the transitive module 100 or the single-chip multimode multi-sublayer PHY 130 may be adapted to use one external clock with an external clock frequency. The transitive module 100 or the single-chip multimode multi-sublayer PHY 130 may be adapted to provide other clocks such as internal clocks which may have frequencies that may be generated from the external clock and are harmonic frequencies of the external clock frequency. Additionally, the transitive module 100 or the single-chip multimode multi-sublayer PHY 130 may be adapted to synchronize the external clock with the other clocks. The external clock and the other clocks may be used to clock circuitry or modules within the transitive module 100 such as the single-chip multi-sublayer PHY 130. Other clock frequencies may be used by the transitive module 100 or the single-chip multi-sublayer PHY 130, but these frequencies may sometimes cause signal distortion in the signal time region 404 of the eye pattern 400. However, the present invention may contemplate means for reducing the effect of such non-harmonic frequencies.

In a further embodiment of the invention, the single-chip multimode multi-sublayer PHY 130 may provide more than one input voltages such as 5V and 3.3V. Additionally, the single-chip multimode multi-sublayer PHY 130 may also have a programmable input voltage. Since 1.8V may be substantially used in the single-chip multi-sublayer PHY 130, the programmable voltage may be set to be 1.8V, although the invention is not limited in this regard. Notwithstanding, if other voltages are needed then a voltage regulator such as external voltage regulator 502 (FIG. 5) may be utilized to generate other voltages such as 1.2V.

Figure 5:
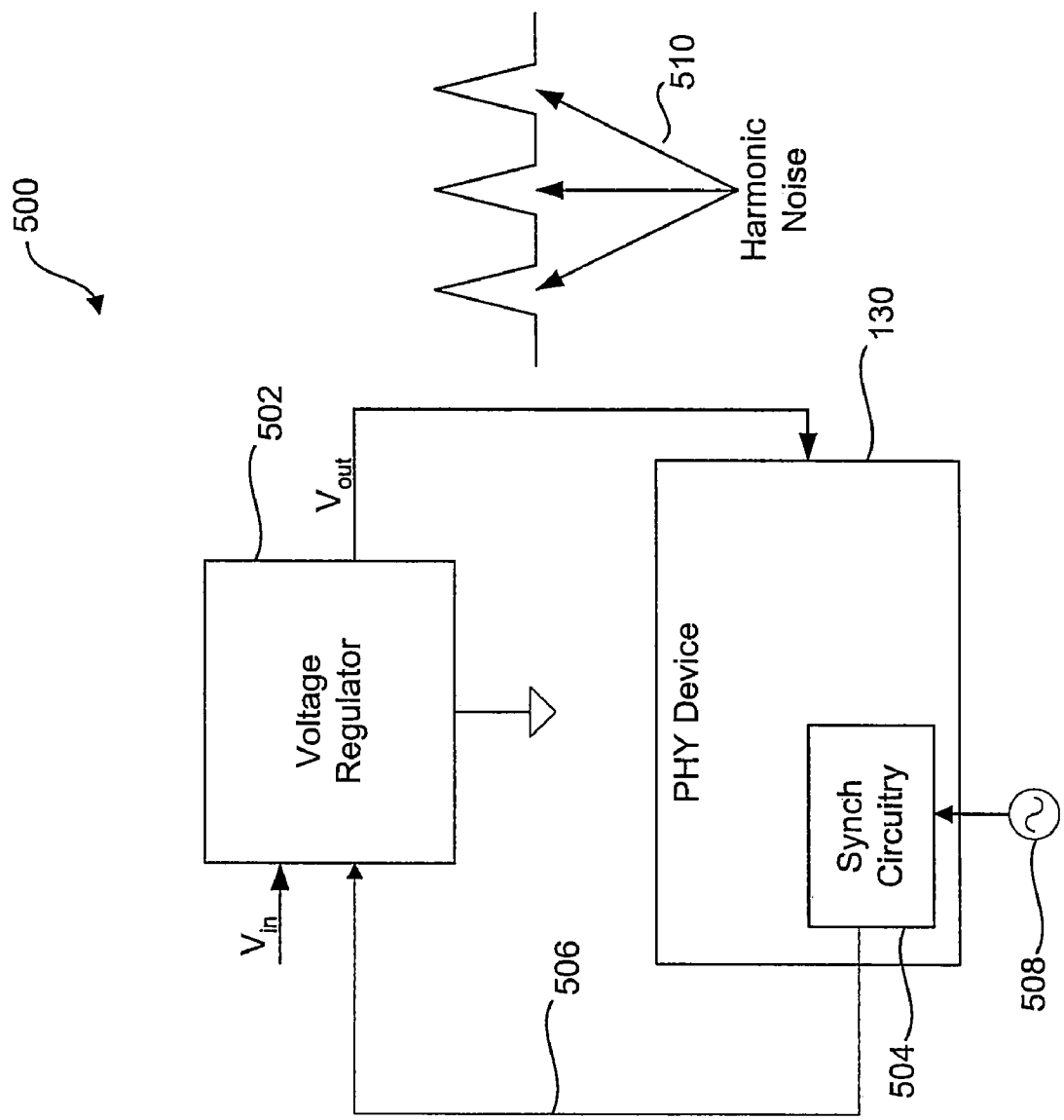
FIG. 5 shows an exemplary system that may provide a voltage-regulated input to the single-chip multimode multi-sublayer PHY of FIG. 2 in accordance with an embodiment of the invention.

FIG. 5 shows an exemplary system 500 that may provide a voltage-regulated input to the single-chip multimode multi-sublayer PHY of FIG. 2 in accordance with an embodiment of the invention. Referring to FIG. 5, there is shown a single-chip multimode multi-sublayer PHY 130, a synchronization circuitry 504, an external clock 508 and a voltage regulator 502. The synchronization circuitry 504 may include at least a combination of digital counters and PLLs.

In one aspect of the invention, external clock 508 may be adapted to have a frequency of about 156.25 MHz. The external clock 508 may be coupled to the synchronization circuitry 504 of the single-chip multimode multi-sublayer PHY 130. In this regard, external clock 508 may provide the clock signal necessary for operation of the synchronization circuitry 504. An output of the synchronization circuitry 504 may be a synchronization clock signal 506. Synchronization clock signal 506 may be configured to have frequency within a particular frequency range such as 300-800 kHz, which may be appropriate for the operation of the voltage regulator 502. The synchronization signal 506 may be generated by the synchronization circuitry 504 and may be coupled to the voltage regulator 502.

In one aspect of the invention, the voltage regulator 502 may be configured to receive an input voltage $V_{in}$ of about 3.3V and may generate an output voltage of about $V_{out}$ 1.2V. The output voltage signal $V_{out}$ of about 1.2V may be coupled to an input of the single-chip multimode multi-sublayer PHY 130, thereby acting as an input voltage source to the single-chip multimode multi-sublayer PHY 130. The 1.2V signal may include noise that may be the result of digital switching. This noise may propagate throughout the single-chip multimode multi-sublayer PHY 130, and especially in those circuits or modules that may utilize the 1.2V signal. However, since the synchronization clock signal 506 may be synchronized with the other clocks with harmonic frequencies or with the external clock frequency 508, the noise on the 1.2V signal may be harmonic noise 510. Therefore, any signal distortions that may appear in the eye pattern 400 (FIG. 4), or other synchronized signals, may be substantially limited to a part of the transition time region 402.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for processing signals in a communication system, the method comprising:
generating, within an on-chip transceiver module, one or more synchronization signals whose corresponding frequencies are harmonics of a frequency of an external clock signal; and
clocking one or more components of said on-chip transitive module via said generated one or more synchronization signals whose corresponding frequencies are harmonic frequencies of said external clock signal.

2. The method according to claim 1, comprising generating said one or more synchronization signals utilizing one or both of: a digital counter and/or a phase locked loop.

3. The method according to claim 1, comprising serializing within said on-chip transitive module, data received from a computer system into a single data stream.

4. The method according to claim 3, comprising transmitting from said on-chip transitive module, said single data stream to an optical network.

5. The method according to claim 4, comprising deserializing within said on-chip transitive module, data received from said optical network into a plurality of data streams.

6. The method according to claim 5, comprising transmitting from said on-chip transitive module, said plurality of data streams to said computer system.

7. A method for processing signals in a communication system, the method comprising:
generating within an on-chip transitive module, one or more harmonic signals from at least one external clock signal, wherein said generated one or more harmonic signals are synchronized with said external clock signal; and
supplying said generated one or more harmonic signals to one or more regulators that provides a voltage to one or more components of said on-chip transitive module.

8. The method according to claim 7, wherein said step of generating said one or more harmonic signals comprises generating at least one harmonic signal whose frequency is a rational multiple of a frequency of said at least one external clock signal.

9. The method according to claim 7, comprising serializing within said on-chip transitive module, data received from a computer system into a single data stream.

10. The method according to claim 9, comprising transmitting from said on-chip transitive module, said single data stream to an optical network.

11. The method according to claim 10, comprising deserializing within said on-chip transitive module, data received from said optical network into a plurality of data streams.

12. The method according to claim 11, comprising transmitting from said on-chip transitive module, said plurality of data streams to said computer system.

13. A system for processing signals in a communication system, the system comprising:
at least one circuitry within an on-chip transitive module that generates one or more synchronization signals whose corresponding frequencies are harmonics of a frequency of an external clock signal; and
said at least one circuitry clocks one or more components of said on-chip transitive module via said generated one or more synchronization signals whose corresponding frequencies are harmonic frequencies of said external clock signal.

14. The system according to claim 13, wherein said at least one circuitry generates said one or more synchronization signals utilizing one or both of: a digital counter and/or a phase locked loop.

15. The system according to claim 13, wherein said at least one circuitry serializes within said on-chip transitive module, data received from a computer system into a single data stream.

16. The system according to claim 15, wherein said at least one circuitry transmits from said on-chip transitive module, said single data stream to an optical network.

17. The system according to claim 16, wherein said at least one circuitry de-serializes within said on-chip transitive module, data received from said optical network into a plurality of data streams.

18. The system according to claim 17, wherein said at least one circuitry transmits from said on-chip transitive module, said plurality of data streams to said computer system.

19. A system for processing signals in a communication system, the system comprising:
at least one circuitry within an on-chip transitive module that generates one or more harmonic signals from at least one external clock signal, wherein said generated one or more harmonic signals are synchronized with said external clock signal; and
said at least one circuitry supplies said generated one or more harmonic signals to one or more regulators that provides a voltage to one or more components of said on-chip transitive module.

20. The system according to claim 19, wherein said step of generating said one or more harmonic signals comprises generating at least one harmonic signal whose frequency is a rational multiple of a frequency of said at least one external clock signal.

21. The system according to claim 19, wherein said at least one circuitry serializes within said on-chip transitive module, data received from a computer system into a single data stream.

22. The system according to claim 21, wherein said at least one circuitry transmits from said on-chip transitive module, said single data stream to an optical network.

23. The system according to claim 22, wherein said at least one circuitry de-serializes within said on-chip transitive module, data received from said optical network into a plurality of data streams.

24. The system according to claim 23, wherein said at least one circuitry transmits from said on-chip transitive module, said plurality of data streams to said computer system.

25. A method for processing signals in a communication system, the method comprising:
generating, within an on-chip transitive module, one or more synchronization signals whose corresponding frequencies are harmonics of a frequency of an external clock signal;
clocking one or more components of said on-chip transitive module via said generated one or more synchronization signals whose corresponding frequencies are harmonic frequencies of said external clock signal; and
supplying said generated one or more synchronization signals to at least one power source that provides at least one component of said on-chip transitive module with an input power, said generated at least one synchronization clock frequency signal reducing signal distortion produced by said at least one power source.

26. The method according to claim 25, wherein said supplying step comprises producing at least one noise signal by said at least one power source, said at least one noise signal being a harmonic noise signal of said generated one or more synchronization signals.

27. The method according to claim 26, wherein said at least one harmonic noise signal comprises a frequency that is a rational multiple of a signal bearing said frequency of said external clock signal.

28. A system for processing signals in a communication system, the system comprising:
at least one circuitry within an on-chip transitive module that generates one or more synchronization signals whose corresponding frequencies are harmonics of a frequency of an external clock signal; and
said at least one circuitry clocks one or more components of said on-chip transitive module via said generated one or more synchronization signals whose corresponding frequencies are harmonic frequencies of said external clock signal, wherein said at least one circuitry supplies said generated one or more synchronization signals to at least one power source that provides at least one component of said on-chip transitive module with an input power, said generated at least one synchronization clock frequency signal reducing signal distortion produced by said at least one power source.

29. The system according to claim 28, wherein said supplying step comprises producing at least one noise signal by said at least one power source, said at least one noise signal being a harmonic noise signal of said generated one or more synchronization signals.

30. The system according to claim 29, wherein said at least one harmonic noise signal comprises a frequency that is a rational multiple of a signal bearing said frequency of said external clock signal.

* * * * *